United States Patent
Li

(12) 
(10) Patent No.: US 6,356,538 B1
(45) Date of Patent: Mar. 12, 2002

(54) PARTIAL SLEEP SYSTEM FOR POWER SAVINGS IN CDMA WIRELESS TELEPHONE DEVICES

(75) Inventor: Kaiping Li, Mount Freedom, NJ (US)

(73) Assignee: Oki Telecom, Inc., Suwanee, GA (US)

( * ) Notice: Subject to any disclaimer, the term of this patent is extended or adjusted under 35 U.S.C. 154(b) by 0 days.

(21) Appl. No.: 09/050,777

(22) Filed: Mar. 30, 1998

(51) Int. Cl.$^7$ ............................................... G08C 17/00
(52) U.S. Cl. ....................... 370/311; 455/343; 370/335
(58) Field of Search .................. 370/311, 335, 370/342; 455/343, 574, 434, 515, 38.3, 701, 702, 703

(56) References Cited

U.S. PATENT DOCUMENTS

| | | | |
|---|---|---|---|
| 4,261,054 A | 4/1981 | Scharla-Nielsen | 455/12 |
| 4,455,623 A | 6/1984 | Wesemeyer et al. | 364/900 |
| 4,755,816 A | 7/1988 | DeLuca | 340/825.44 |
| 4,893,094 A | 1/1990 | Herold et al. | 331/1 A |
| 5,093,840 A | 3/1992 | Schilling | 375/1 |
| 5,107,487 A | 4/1992 | Vilmur et al. | 370/18 |
| 5,140,698 A | 8/1992 | Toko | 455/76 |
| 5,180,992 A | 1/1993 | Akiyama et al. | 331/11 |
| 5,241,690 A | 8/1993 | Larsson et al. | 455/54.1 |
| 5,278,521 A | 1/1994 | Sato | 331/14 |
| 5,392,287 A | 2/1995 | Tiedemann, Jr. et al. | 370/95.1 |
| 5,509,015 A | 4/1996 | Tiedemann, Jr. et al. | 370/95.3 |
| 5,566,357 A | 10/1996 | Holcman | 455/54.1 |
| 5,627,882 A | 5/1997 | Chien et al. | 379/61 |
| 5,790,941 A * | 8/1998 | Peponides | 455/87 |
| 5,910,944 A * | 6/1999 | Callicotte et al. | 370/311 |
| 5,920,549 A * | 7/1999 | Bruckert et al. | 370/331 |
| 5,950,120 A * | 9/1999 | Gardner et al. | 455/343 |
| 5,950,131 A * | 9/1999 | Vilmur | 455/434 |
| 5,987,339 A * | 11/1999 | Asano | 455/574 |
| 6,069,880 A * | 5/2000 | Owen et al. | 370/311 |
| 6,073,035 A * | 6/2000 | Witter | 455/574 |

* cited by examiner

*Primary Examiner*—Chau Nguyen
*Assistant Examiner*—D. Trinh
(74) *Attorney, Agent, or Firm*—Thomas, Kayden, Horstemeyer & Risley, LLP

(57) ABSTRACT

A system for operating a wireless communications device in a manner that significantly reduces the power consumption of the device. In accordance with one aspect of the invention, a system is provided for operating a wireless communications device in a low power mode including the step of controlling the operation of circuit components to operate in either a low-power standby mode or an operating mode. The system includes detecting a first condition and, in response to the detection of the first condition, operating a first set of circuit components in a low-power standby mode while operating a second set of circuit components in the operating mode. The system further includes detecting a second condition and, in response to the detection of the second condition, operating substantially all the circuit components in the operating mode. In the preferred embodiment, the system further includes detecting a third condition and, in response to the detection of the third condition, operating a third set of circuit components in a low-power standby mode while operating a fourth set of circuit components in the operating mode.

18 Claims, 9 Drawing Sheets

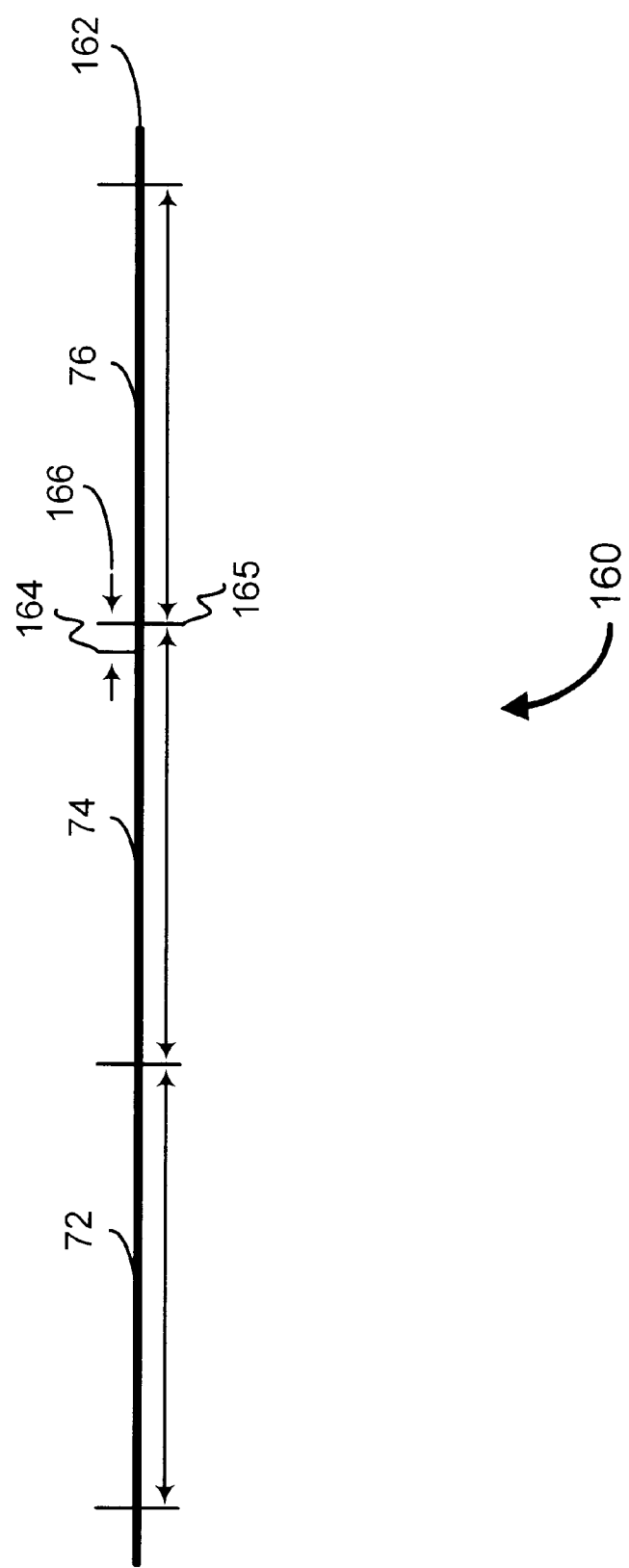

PARTIAL SLEEP SYSTEM FOR POWER SAVINGS IN CDMA WIRELESS TELEPHONE DEVICES

BACKGROUND OF THE INVENTION

The present invention generally relates to the field of wireless telecommunications devices, and more specifically to systems for reducing power consumption in wireless telecommunications devices, thereby extending battery life and improving overall system performance.

As is known, wireless telecommunications devices typically derive their operating power from a battery. The larger the battery, i.e., the greater the battery capacity, the longer the wireless telecommunications device is able to operate without requiring replacement or recharging of the depleted battery. Given size and weight restrictions, the designer of the wireless device is under extreme pressure to use the minimum sized battery that will provide a reasonable amount of use between battery replacement or recharge. With the size of a battery generally being fixed by external factors, the designer must devote more time and money to increasing the amount of time that the wireless telecommunications device can operate using the chosen battery, i.e., increasing the battery life. Increased battery life (resulting from lowering the power consumption requirements of a device) allows for greater talk times, longer stand by times, and permits the use of smaller and less expensive batteries.

Typically, there are many different methods for increasing battery life. These range from using different and perhaps more efficient circuit components that use less battery current when operating, decreasing the total number of components used, integrating multiple discreet components into a single integrated circuit, etc. However, once a circuit design has been finalized, there are only a few ways to increase battery life. One known method used to increase battery life in a digital circuit is to implement a sleep function in the circuitry. Typically, a sleep function will either power down the entire circuit or power down certain non-critical portions of the circuit when the wireless communications device is not in active use. During sleep mode, the wireless communications device must retain the ability to receive incoming calls from other users and control commands from the controlling base stations, so the wireless communications device cannot be placed into a total power down mode, i.e., the phone cannot be turned off. Also, many wireless communications devices must retain a timing reference which is accurate with respect to the system time in order to prevent the wireless communications device from losing synchronization with the system.

In the Code Division Multiple Access (CDMA) standard, as specified by the TIA/EIA/IS-95A "Mobile Station-Base Station Compatibility Standard for Dual-Mode Wideband Spread Spectrum Cellular System," a CDMA subscriber unit (the wireless communications device) is assigned a certain time slot, where its communications are placed. Any CDMA device that is placed in a power down, or sleep, mode must nevertheless retain the ability to monitor its assigned slot. If the CDMA subscriber unit cannot do this, then it is not allowed to power down. When a CDMA subscriber unit is operating in this fashion, it is referred to as operating in slotted mode. Additionally, in the TIA/EIA/IS-95A standard, there are provisions for the controlling base station to command a subscriber unit to scan extra CDMA frequencies for potential connection hand-off base stations (e.g., when traveling from zone to zone). This is known as a scanning mode. As with the slotted mode, it is important for CDMA subscriber units to monitor commands that are received from base stations, such as those instructing the units of new pilot channels (e.g., connection hand-offs).

SUMMARY OF THE INVENTION

The present invention is generally directed to a system for improving the battery life in a wireless communications device by placing certain portions of the wireless communications device in either a low power state or shutting down power to these portions entirely, where the specific portions of the wireless communications device which are placed into the low power state or shut down depends on the current operating mode of the wireless communications device. In accordance with one aspect of the present invention, a method is provided for operating a wireless communications device in a low power mode, including a step of controlling the operation of circuit components to operate in either a low-power standby mode or an operating mode. The method detects a first condition and, in response to the detection of the first condition, operates a first set of circuit components in a low-power standby mode while operating a second set of circuit components in the operating mode. The method further includes the steps of detecting a second condition and, in response to the detection of the second condition, operating substantially all the circuit components in the full power operating mode.

In a preferred embodiment, the method further includes the steps of detecting a third condition and, in response to the detection of the third condition, operating a third set of circuit components in a low-power standby mode while operating a fourth set of circuit components in the operating mode. The first condition is the recognition of operation of the wireless device in a slotted mode of operation, when the device is communicating in accordance with a Code Division Multiple Access (CDMA) standard. The first set of circuit components preferably includes a pilot channel searching component, at least one data demodulating component, an automatic gain controller unit, an arithmetic unit, and a combiner unit, or any subset of components thereof.

The second condition is the recognition of operation of the wireless device in a scanning mode of operation when the device is communicating in accordance with a CDMA standard. The third set of circuit components preferably includes at least one data demodulating component, an automatic gain controller unit, an arithmetic unit, and a combiner unit, or any subset of components thereof. The fourth set of circuit components preferably includes a pilot channel searching component, an arithmetic unit, a plurality of registers, and a state machine that is configured to control the operation of the circuit components, or any subset of components thereof.

According to a preferred embodiment of the present invention, and depending on the functional and power requirements of the current operating mode of the wireless communications device, all power may be removed, or normal power may be applied, to each specific portion of the circuitry in the wireless communications device. Therefore, the present invention provides a system for reducing the power usage of a wireless communications device by powering down or turning off select portions of the device (depending on the present mode of operation) which are not needed. The invention further provides a system where, depending on the specific functional requirements of the wireless communications device, the circuitry in the wireless communications device may be specifically turned on or off.

Objects, features, and advantages of the present invention will become apparent upon reading and understanding the present specifications, when taken in conjunction with accompanying drawings.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 9 is a diagram displaying the timing of the events required to bring the wireless telecommunications device out of sleep mode, ensuring that no incoming paging messages are lost, in accordance with a preferred embodiment of the present invention.

DESCRIPTION OF THE PREFERRED EMBODIMENTS

Figure 1:
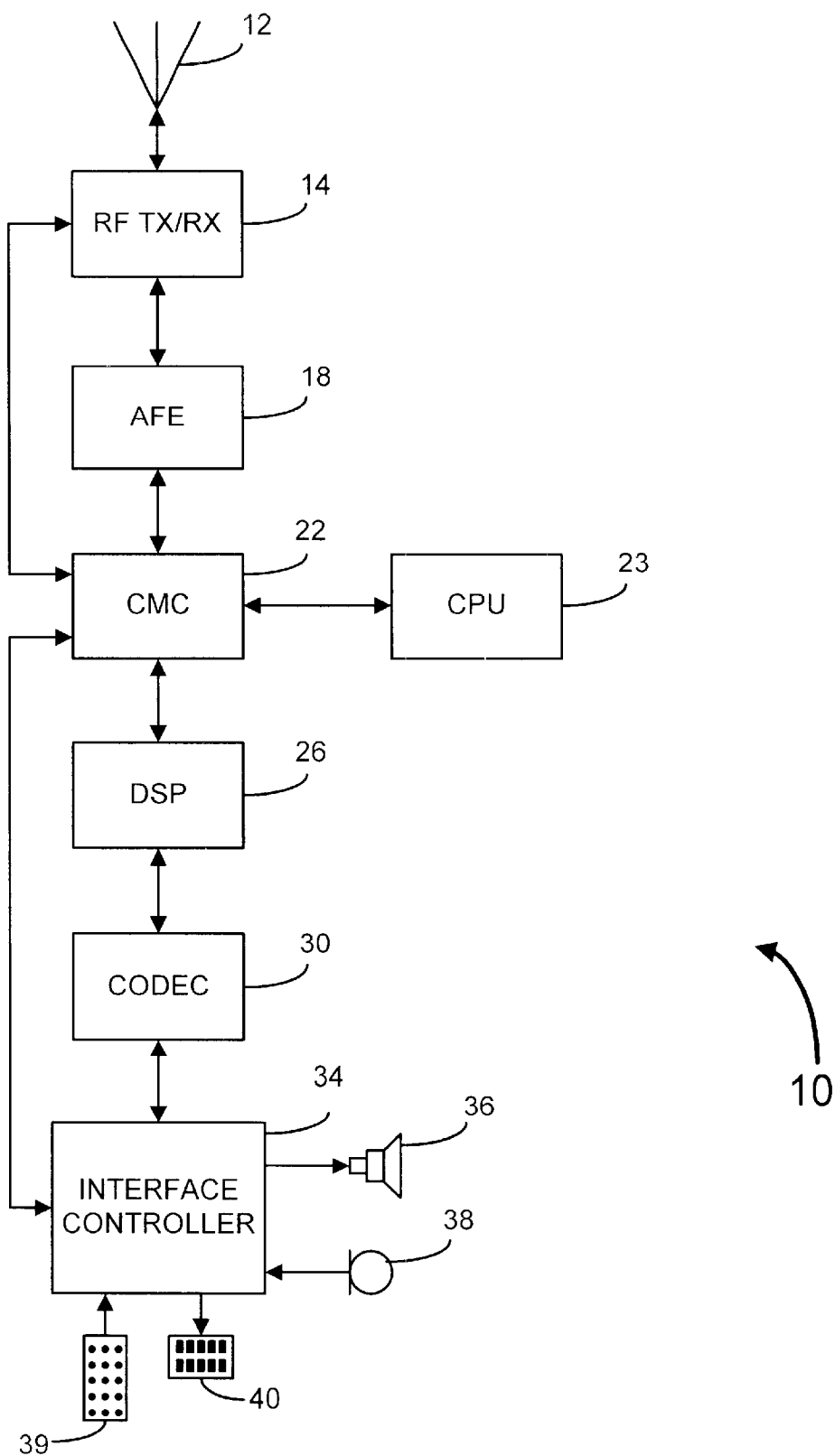
FIG. 1 is a block diagram representation of a CDMA wireless telephone, in accordance with a preferred embodiment of the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now to the drawings, in which like numbers represent like components throughout the several views, FIG. 1 shows a block diagram of a code division multiple access (CDMA) wireless telephone 10 in accordance with a preferred embodiment of the present invention. The diagram additionally applies to a variety of wireless communication devices of alternate embodiments of the present invention, including multi-mode cellular and PCS telephones. According to the preferred embodiment of the present invention, radio signals are received through an antenna 12 and then filtered, mixed to lower frequencies, automatic gain controlled, and I and Q demodulated (separating the combined received signal into its in-phase (I) and quadrature-phase (Q) components) in a radio frequency transmit/receive (RF TX/RX) circuit 14. Then, the signals are converted, in an analog front end (AFE) 18, from analog to digital form and supplied to a CDMA modem circuit (CMC) 22. As controlled by a central processing unit (CPU) 23, the CMC 22 demodulates the I and Q signals into an interleaved signal stream which, according to the preferred embodiment of the present invention, is de-interleaved, Viterbi decoded, and speech decoded (digitally) by a digital signal processor (DSP) 26. Thereafter, the signals is decoded by a coder/decoder (CODEC) 30 into an audio signal, which is controllably amplified by an interface controller 34 and output through a telephone speaker 36. Likewise, a reverse path, initiated at the telephone microphone 38, is followed through the wireless telephone 10 for outgoing communications. A keypad 39 and a display 40 provide conventional user input and output.

Figure 2:
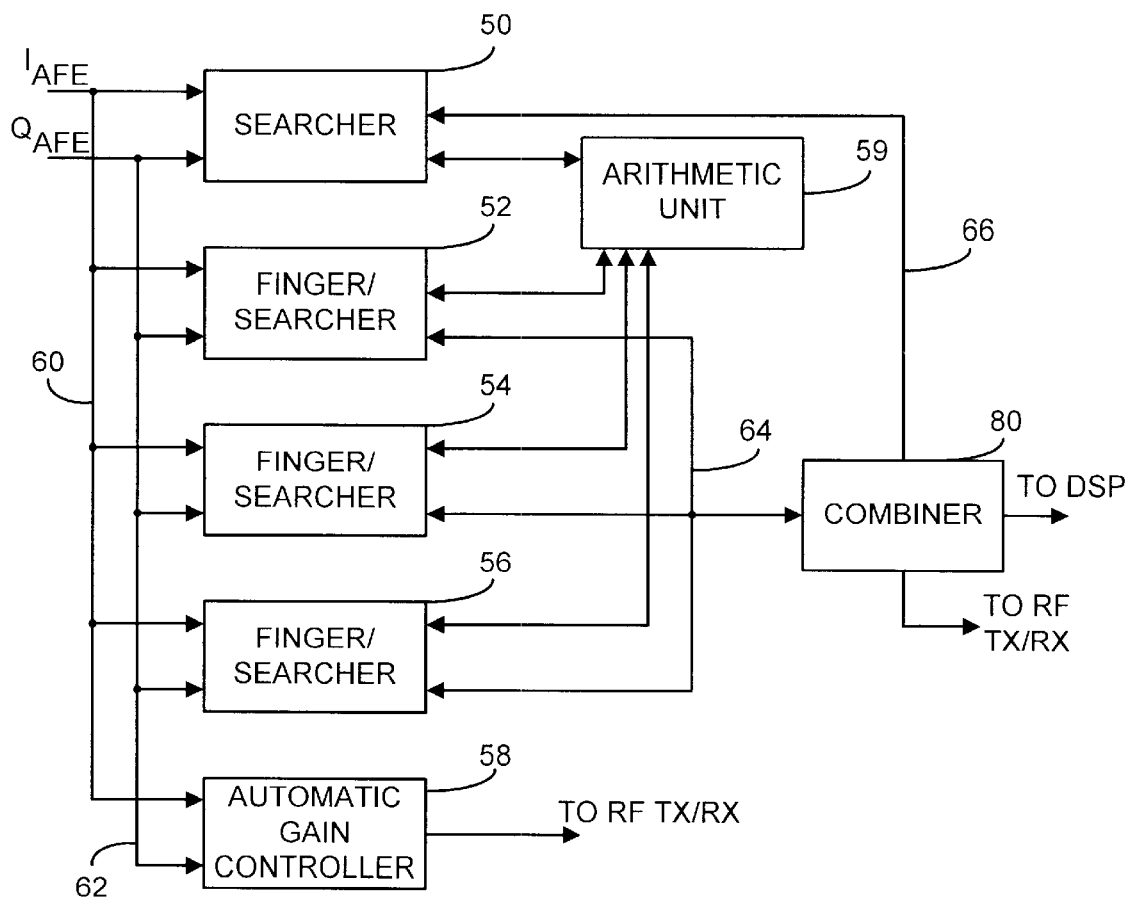
FIG. 2 is a block diagram representation of a receive portion of the CDMA modem circuit (CMC) of FIG. 1, in accordance with a preferred embodiment of the present invention.
Figure 2:
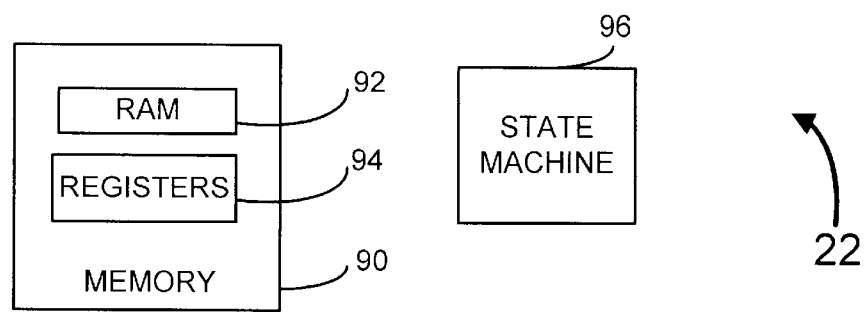

Reference is now made to FIG. 2 which shows receive path components of the CMC 22 of FIG. 1, in accordance with the first preferred embodiment of the present invention. Among other components, the CMC 22 includes a searcher unit 50, a data demodulation finger unit 52, a data demodulation finger unit 54, a data demodulation finger unit 56, and an automatic gain controller (AGC) 58, all of which receive digital signals in parallel via an $I_{AFE}$ path 60 and a $Q_{AFE}$ path 62. In accordance with one implementation of the preferred embodiment of the present invention, the CMC 22 also includes a preceding AFE interface circuit (not shown), which removes DC bias (offset) from the I and Q signals received from the AFE 18 (FIG. 1) so that the signals on the $I_{AFE}$ path 60 and the $Q_{AFE}$ path 62 do not contain any DC bias.

The searcher unit 50 is responsible for, among other functions, assisting in acquiring the pilot channel. The functionality of the components will be appreciated by those skilled in the art, as the pilot channel scan is defined in the TIA/EIA/IS95A standard. The three data demodulation finger units 52, 54 and 56 are responsible for demodulating traffic channel data from multi-path sources and other base stations, as well as, in accordance with the present invention, assisting in acquiring a pilot channel during a searcher mode of operation. The AGC 58 is responsible for adjusting the gain used to improve reception of incoming signals. The arithmetic unit 59 provides mathematical support to the searcher unit 50 and data demodulation finger units 52, 54, and 56. The CMC 22 also includes a memory 90, including random access memory (RAM) 92 and registers 94, through which various elements of the CMC 22 have communication paths (not shown) with each other and with the CPU 23 (FIG. 1). Each component of the CMC 22 has a separate designated memory space in the memory 90. Additionally, a state machine 96 directs the functionality of the different components of the CMC 22, including selecting and enabling components, as well as operating multiplexers and supervising data transfers between elements.

A combiner 80 combines data demodulation finger data, as well as data demodulation finger and searcher time tracking information, in order to provide fine tuning time tracking information for the mobile station via paths 64 and 66. Combined data demodulation finger data output from the combiner 80 arrives at the DSP 26 (FIG. 1) for de-interleaving, Viterbi decoding, and digital speech decoding. A component of the combiner 80 generates frequency error information used in the RF TX/RX 14 (FIG. 1) to automatically track the frequency of incoming signals. The combiner 80 actually includes three different combiners sharing common circuitry (not shown). These three combiners include a frequency error combiner that combines frequency error data from the data demodulation finger units 52, 54 and 56, a symbol combiner that combines symbols of data from the data demodulation finger units 52, 54, and 56, and a power control combiner that combines power control bits transmitted from the base station to adjust mobile station transmitted power.

Figure 3:
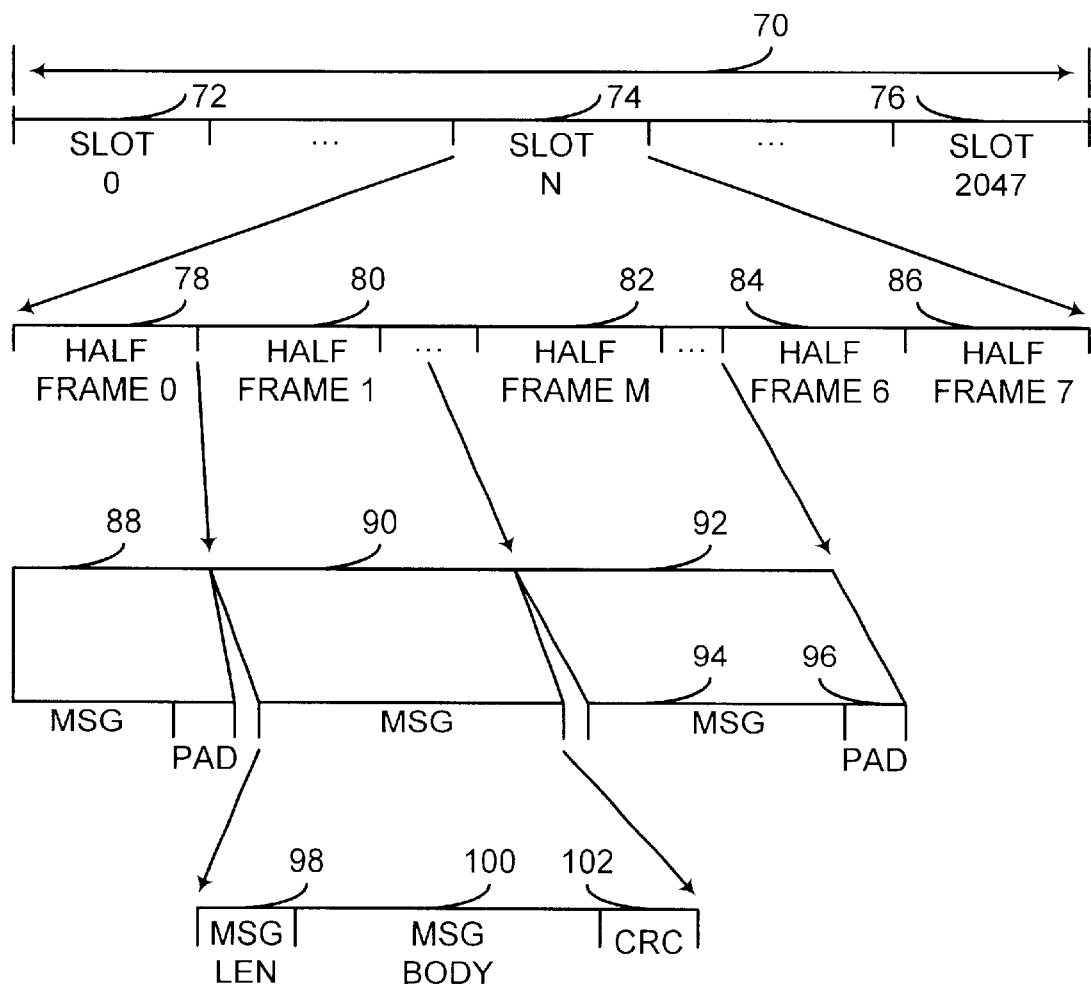
FIG. 3 is a diagram displaying the structure of the paging channel of the CDMA system, as specified in the TIA/EIA/IS-95A interim standard.

Reference is now made to FIG. 3, which displays the structure of a paging channel 60, as specified in the TIA/EIA/IS-95A CDMA standard. The paging channel 60 is comprised of 2048 paging channel slots, numbered 0 through 2047, of which paging channel slots 72, 74, and 76 are examples. These 2048 paging channel slots are transmitted over the air and are repeated once all 2048 slots are transmitted. Each paging channel slot 74 is comprised of eight paging channel half frames, numbered 0 through 7, of which paging channel half slots 78, 80, 82, 84, and 86 are examples. Paging channel messages, for example, 88, 90, and 92 are transmitted on the paging channel half frame. Paging channel messages may be either synchronized 90, which means that they begin on a paging channel half frame boundary, or the messages may be unsynchronized 92 when the message does not begin on a paging channel half frame boundary. Unsynchronized paging channel messages 92 also contain a pad field 96 of unspecified length to align the end of the unsynchronized paging channel message 92 with the end of a paging channel half frame. Synchronized paging channel messages 90 do not contain a pad field. Each paging channel message, regardless if they are synchronized 90 or unsynchronized 92, are made up of a message length field 98, a message body field 100, and a cyclic redundancy check (CRC) field 102.

Figure 4:
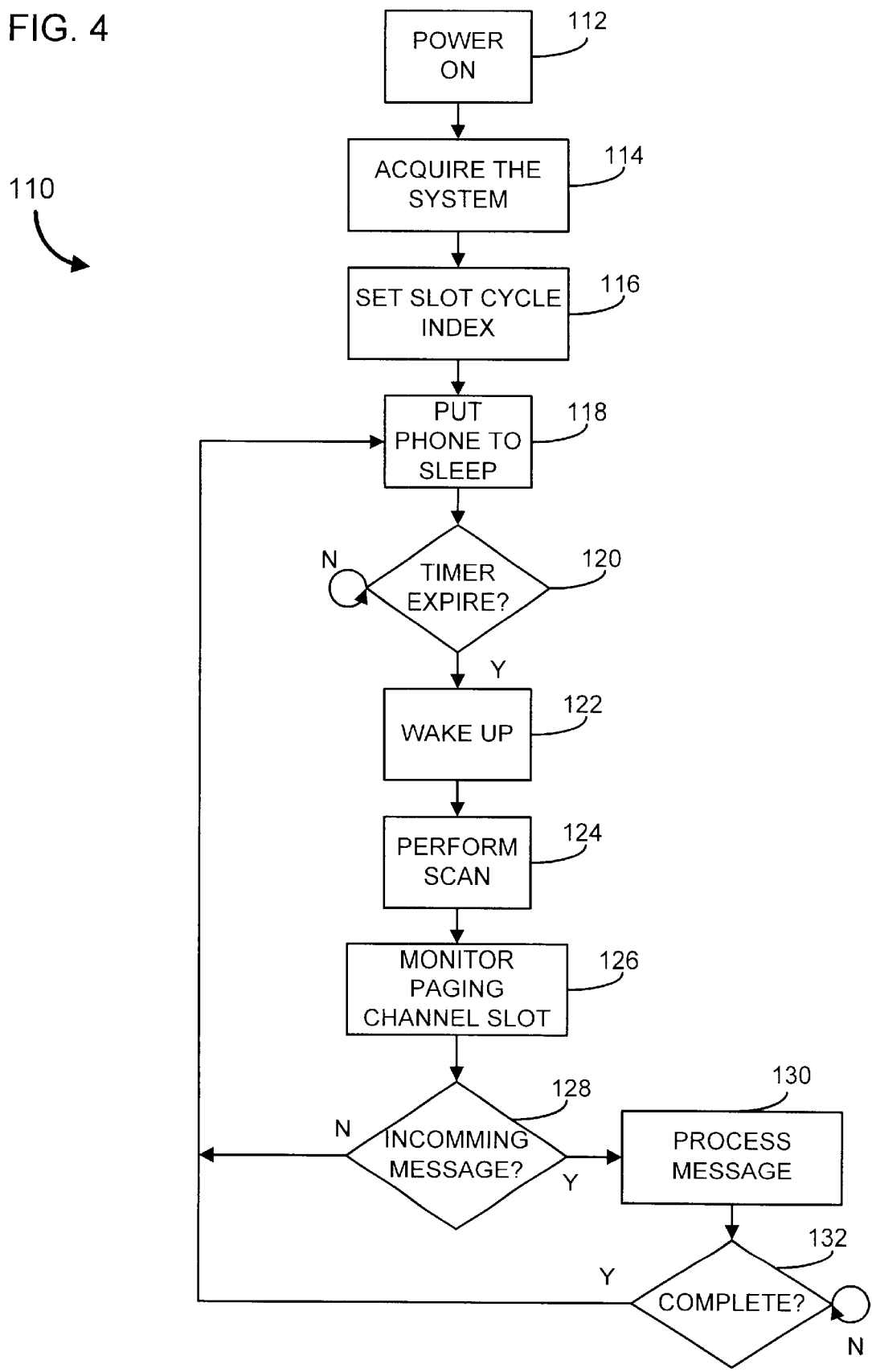
FIG. 4 is a flow diagram representation of the operation of the wireless telecommunications device as it enters slotted mode operation, in accordance with a preferred embodiment of the present invention.

Reference now is made to FIG. 4, which shows a flow diagram 110 displaying the steps the wireless communications device 10 (FIG. 1) performs when operating in slotted mode, in accordance with a preferred embodiment of the present invention. Initially, the wireless communications device 10 (FIG. 1) is powered on by the user (step 112). After powering on, the wireless communications device 10 (FIG. 1) acquires the CDMA system (step 114). Once the wireless communications device 10 (FIG. 1) acquires the CDMA system and makes sure that it does not have any messages to process, the wireless communications device 10 (FIG. 1) sets its slot cycle index (SCI) (step 116). The SCI specifies the number of paging channel slots the wireless communications device 10 (FIG. 1) can skip and which paging channel slots the wireless communications device 10 (FIG. 1) must monitor. After setting the SCI, the wireless communications device 10 (FIG. 1) puts itself to sleep (block 118). When the wireless communications device 10 (FIG. 1) is in sleep mode, the circuitry in certain portions of the wireless communications device 10 (FIG. 1) is powered down. The circuitry powered down in the wireless communications device 10 (FIG. 1) includes circuitry in the RF TX/RX 14 (FIG. 1), the AFE 18 (FIG. 1), the CMC 22 (FIG. 1), the CPU 23 (FIG. 1), the DSP 26 (FIG. 1), the CODEC 30 (FIG. 1), and the interface controller 34 (FIG. 1).

However, the need to respond to incoming phone calls and control messages from the controlling base station, and the maintenance of the synchrony between the local time and the CDMA system time prevents the complete powering down of all the circuitry in the wireless communications device 10 (FIG. 1). Instead, some power must be maintained to portions of the RF TX/RX 14 (FIG. 1), the AFE 18 (FIG. 1), the CMC 22 (FIG. 1), and the CPU 23 (FIG. 1) to, for example, operate the local clock in the wireless communications device 10 (FIG. 1). Additionally, a small amount of power is drawn by the CPU 23 (FIG. 1), the DSP 26 (FIG. 1), the CODEC 30 (FIG. 1) to provide power to the memory cells within these circuits, preventing the loss of information stored in the memory cells.

Figure 5:
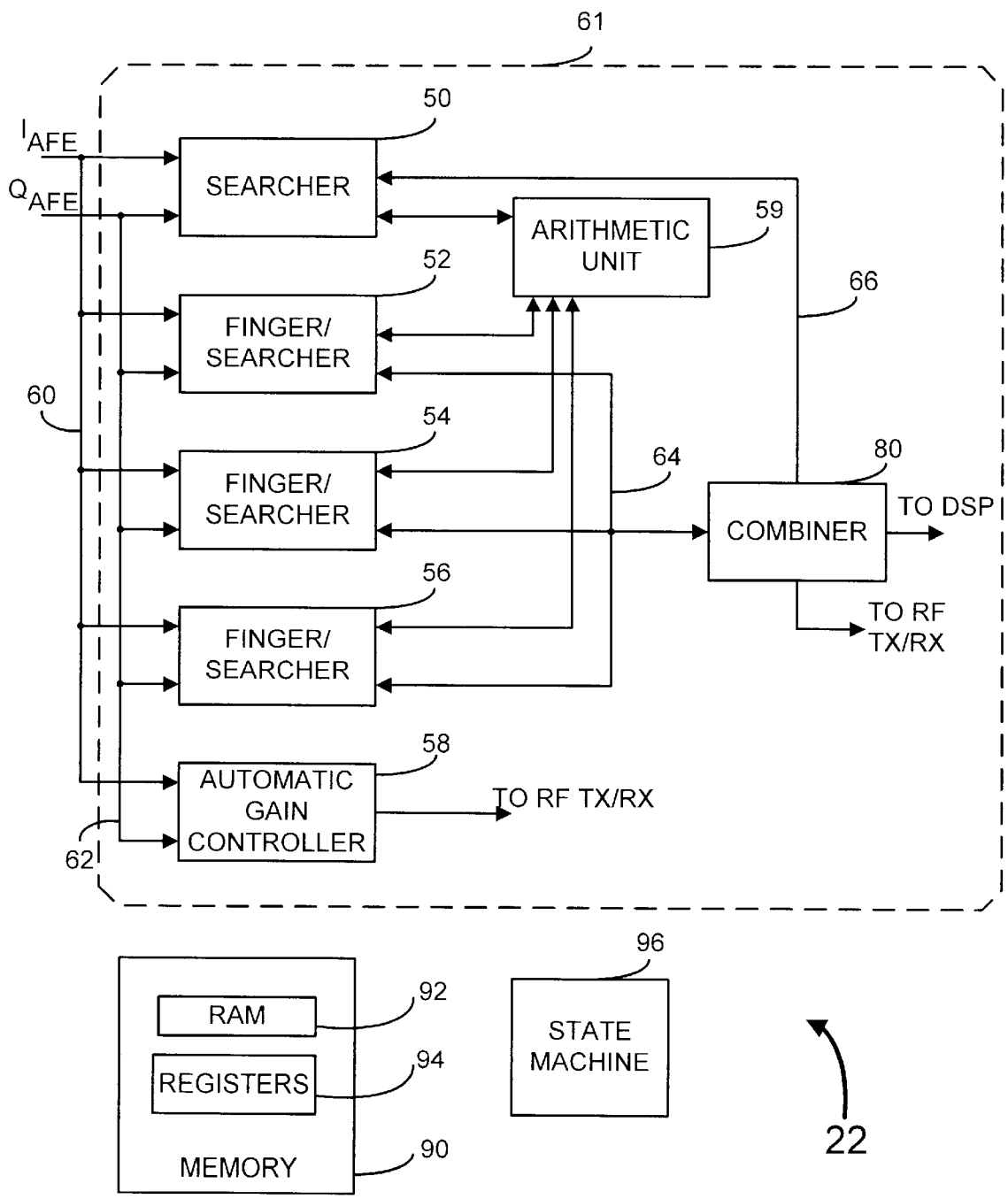
FIG. 5 is a block diagram of the CMC of FIG. 1 displaying the portions of the circuitry of the CMC which are and are not powered down when the wireless telecommunications device is operating in slotted mode, in accordance with a preferred embodiment of the present invention.

Reference is now made to FIG. 5, which shows a detailed diagram of the CMC 22, specifically illustrating that circuitry in the CMC 22 which is powered down and the circuitry which is not powered down, during sleep mode when the wireless communications device 10 (FIG. 1) is operating in slotted mode. Specifically, circuit elements within the dashed box 61 are powered down, and circuit elements not within the dashed box remain powered during slotted mode. As illustrated in FIG. 4, after putting the wireless communications device 10 (FIG. 1) into sleep mode (step 118), the CPU 23 (FIG. 1) continues to operate its timing devices and a counter to maintain track of the expired time. In decision block 120, the CPU 23 (FIG. 1) checks to see if the expired time is equal to the amount of time (predetermined) the wireless communications device 10 (FIG. 1) is allowed to sleep. If the time in sleep mode is not equal to the amount of time allowed, the wireless communications device 10 (FIG. 1) remains asleep. Once the wireless communications device 10 (FIG. 1) has slept the appropriate amount of time, i.e., the correct number of paging channel slots have passed, the wireless communications device 10 (FIG. 1) wakes up (step 122), and then the CMC 22 (FIG. 1) performs a scan (step 124) of the base station pilot channel sequences in the active set, as conventionally defined. The scanning of the base station pilot channel sequences of the active set is performed to ensure that the wireless communications device 10 (FIG. 1) remains in synchrony with the CDMA system time and that the controlling base station for the wireless communications device 10 (FIG. 1) is still present.

The need to perform such a scan requires that the wireless communications device 10 (FIG. 1) wake up sufficiently prior to the expected arrival of the paging channel slots to ensure that the pilot channel scan is performed and the paging channel slots are not missed. After the wireless communications device 10 (FIG. 1) has synchronized with the CDMA system, the wireless communications device 10 (FIG. 1) monitors the paging channel slot (step 126) which it must monitor. If in the paging channel slot there was a message intended for the wireless communications device 10 (step 128) (FIG. 1), the wireless communications device 10 (FIG. 1) would process the message (step 130) or incoming phone call. Once the processing of the message is complete or the phone call is complete (step 132), the wireless communications device 10 (FIG. 1) returns to block 118 and places the circuitry back into sleep mode.

Figure 6:
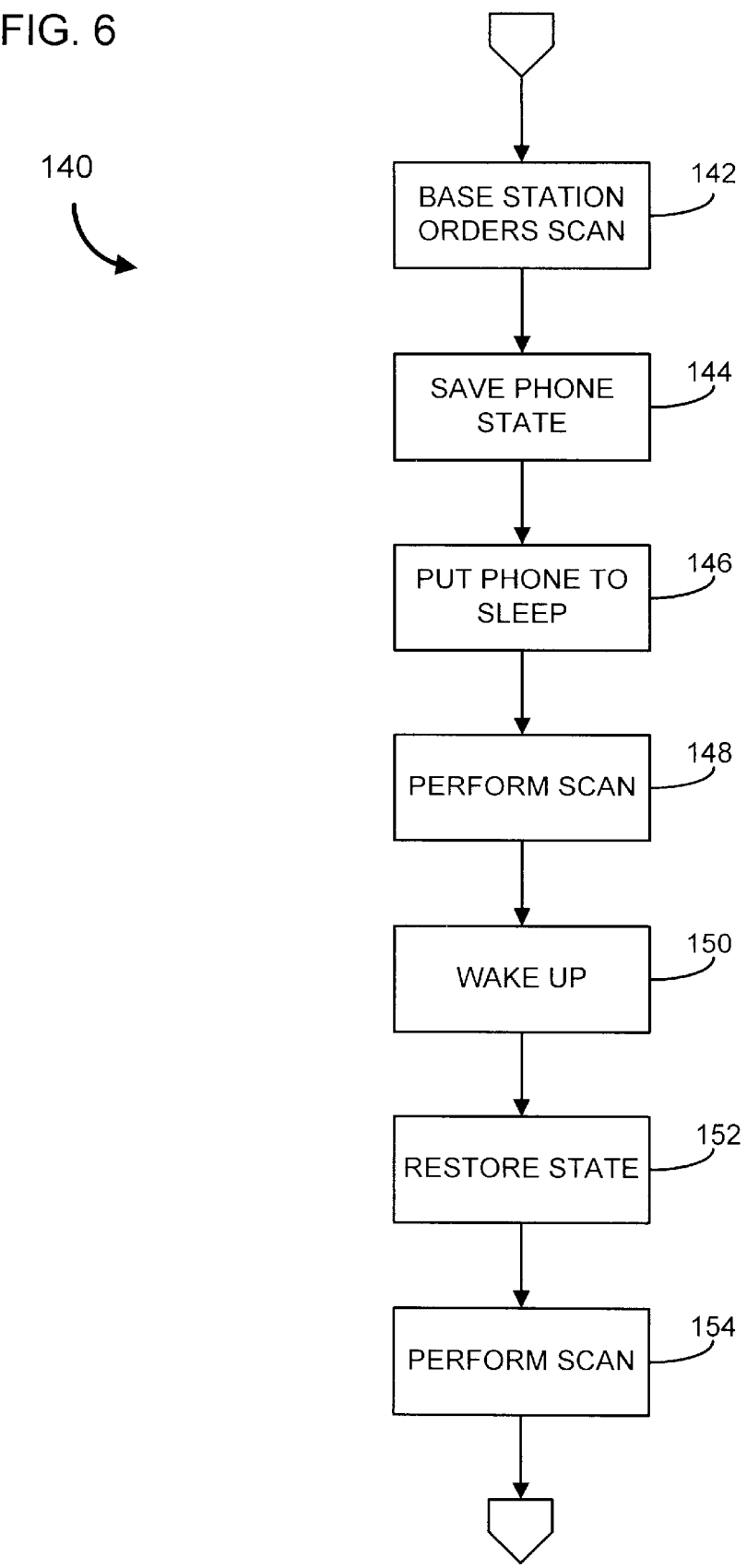
FIG. 6 is a flow diagram representation of the operation of the wireless telecommunications device as it enters the scanning for alternate base stations in a different CDMA frequency mode of operation, in accordance with a preferred embodiment of the present invention.

Reference is now made to FIG. 6, which shows a flow diagram 140 displaying the steps the wireless communications device 10 (FIG. 1) performs when it is scanning an alternate CDMA frequency band for candidate base stations, as ordered to do so by a controlling base station. The controlling base station may order (step 142) the wireless communications device 10 (FIG. 1) to perform such a frequency scan at any time during operation, with exception given to the times when the wireless communications device 10 (FIG. 1) is currently in a phone call or when it is sleeping when operating in slotted mode. Such an order may also be received as one type of incoming message at step 128 of FIG. 4, with the remaining steps of FIG. 6 also corresponding to step 130 of FIG. 4. After the controlling base station sends a control message to the wireless communications device 10 (FIG. 1) specifying that an alternate CDMA frequency scan be performed, the wireless communications device 10 (FIG. 1), begins by saving its current operating state to memory (step 144). The current operating state may include information such as the identification of the current controlling base station, the SCI, etc. After saving the operating state to memory, the wireless communications device 10 (FIG. 1) puts its circuitry to sleep (step 146). Due to the fact that the wireless communications device 10 (FIG. 1) must remain active to perform a pilot channel scan of an alternate CDMA frequency band, only select circuit components in the wireless communications device 10 (FIG. 1) can be placed to sleep, while others must remain operational. The circuitry powered down in the wireless communications device 10 (FIG. 1) includes portions of the AFE 18 (FIG. 1) and the CMC 22 (FIG. 1), and the entire DSP 26 (FIG. 1). The remainder of the wireless communications device 10 (FIG. 1) must remain active to perform the pilot channel scan (step 148).

Figure 7:
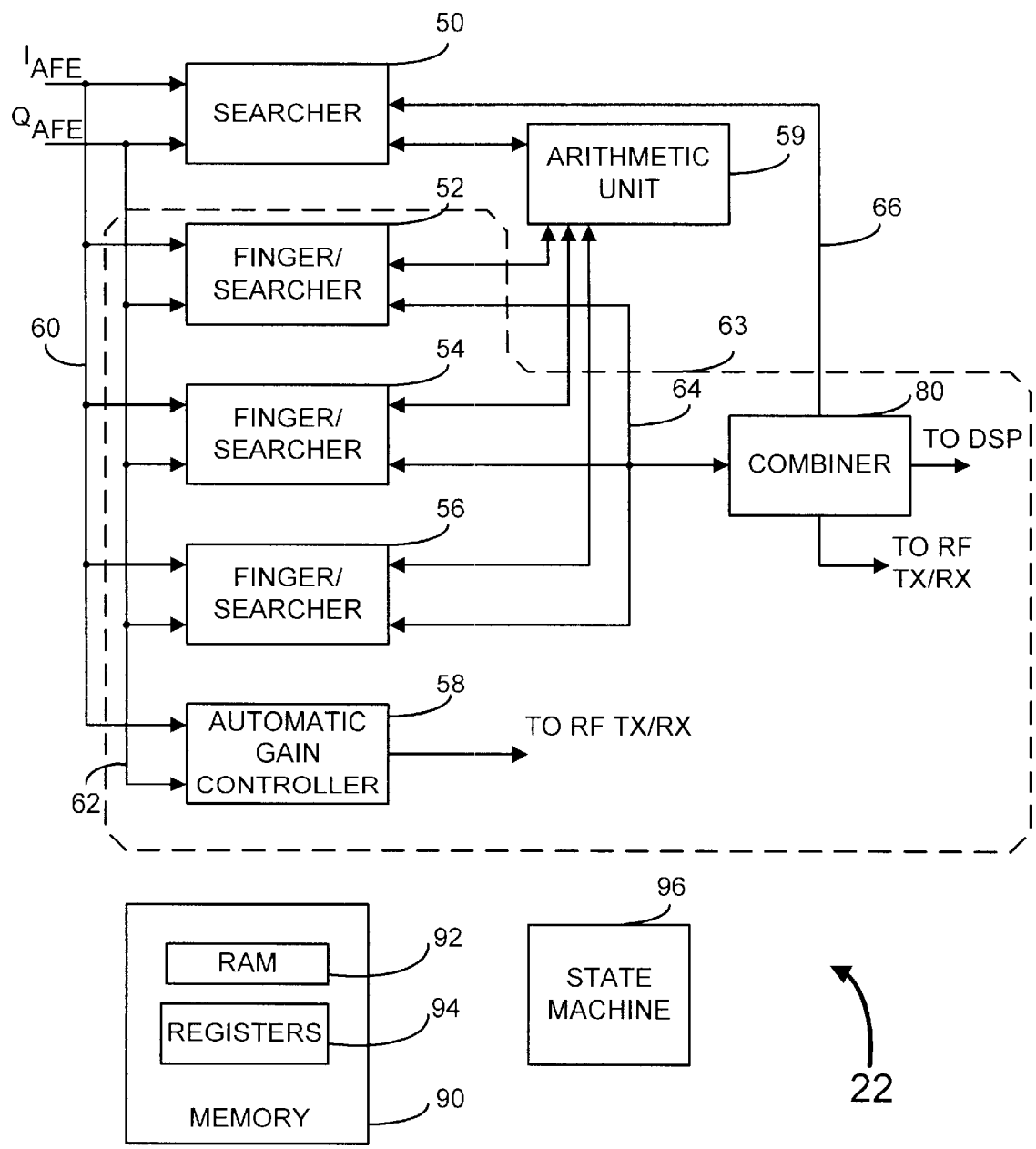
FIG. 7 is a block diagram of the CMC of FIG. 1 displaying the portions of the circuitry of the CMC which are and are not powered down when the wireless telecommunications device is scanning for alternate base stations in a different CDMA frequency band, in accordance with a preferred embodiment of the present invention.
Figure 8:
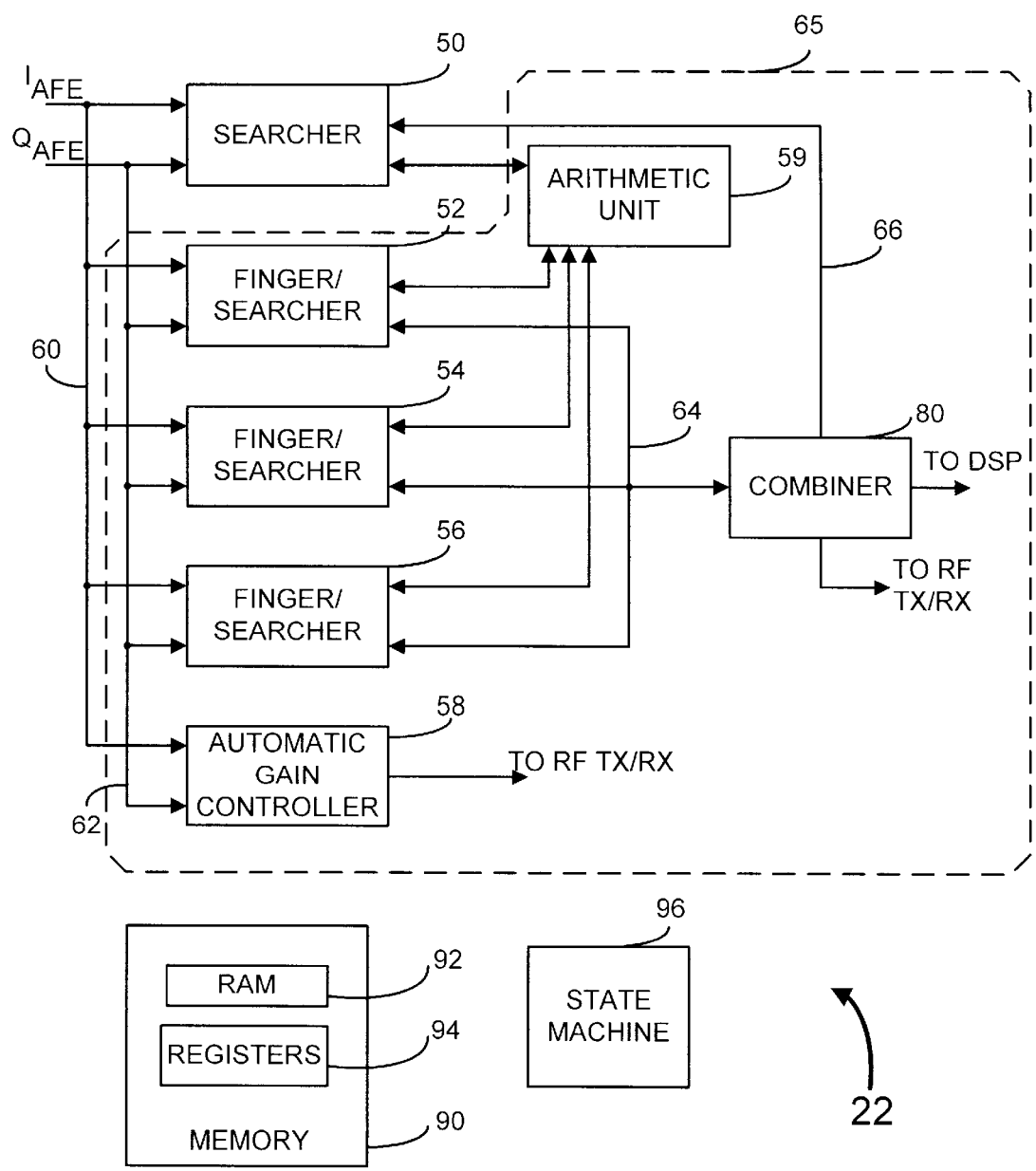
FIG. 8 is a block diagram of the CMC of FIG. 1 displaying the portions of the circuitry of the CMC which are and are not powered down when the wireless telecommunications device is scanning for alternate base stations in a different CDMA frequency band, in accordance with an alternative embodiment of the present invention.

Reference is now made to FIG. 7 for a detailed diagram of the CMC 22, displaying circuitry in the CMC 22 which is powered down and circuitry which is not powered down when the wireless communications device 10 (FIG. 1) is performing the pilot channel scan for alternate base stations (step 148 of FIG. 6). Specifically, circuit elements within the dashed box 63 are powered down, and circuit elements not within the dashed box 62 remain powered during the search. Reference is now made to FIG. 8 for an alternative embodiment of the present invention, in which the arithmetic unit 59 is also powered down. In the alternative embodiment, the searcher 50 possesses the necessary logic to perform estimations of the mathematical calculations which were previously performed in the arithmetic unit 59. Specifically, the elements within the dashed box 65 are operated at a reduced power level, when the device 10 is placed in sleep mode. Returning to FIG. 6, after the wireless communications device 10 (FIG. 1) completes the pilot channel scan of the alternate CDMA frequency, the wireless communications device 10 (FIG. 1) wakes up (step 150) and communicates information regarding any newly discovered base stations which it finds to the controlling base station. In block 152, the wireless communications device 10 (FIG. 1) restores (step 152) from memory the saved operating state of the wireless communications device 10 (FIG. 1), saved in block 144. The wireless communications device 10 (FIG. 1) must then perform a pilot channel scan (step 154) of the pilot channels in the current active set to ensure that its local timing is in synchrony with the CDMA system time. After completing the scan of the pilot channels in the candidate set, the wireless communications device 10 (FIG. 1) is back to normal and is ready to receive incoming calls and control messages.

Reference is now made to FIG. 9 for a diagram displaying a typical partitioning 160 of the CDMA paging channel and the timing of events occurring when the wireless communications device 10 (FIG. 1) wakes up from sleep mode. A CDMA system time line 162 is partitioned into slots 72, 74, and 76 with each slot lasting 80 milli-seconds, each slot representing a paging channel slot. The paging channel slot 74 displays the timing of the events which occur when the wireless communications device 10 (FIG. 1) is preparing to wake up from sleep mode. As defined by the TIA/EIA/IS-95-A standard, the wireless communications device 10 (FIG. 1) must wake up prior to the paging channel slot that it must monitor. This is displayed in the diagram of the paging channel slot 74. The early wake up 164 is to ensure that the wireless communications device 10 (FIG. 1) does not miss the paging channel slot. In the time between the early wake up 164 and the beginning of another paging channel slot 165, the wireless communications device 10 (FIG. 1) performs a scan of the pilot channel of the base stations within the active set.

The power savings achieved when putting the wireless communications device 10 (FIG. 1) into sleep mode (in accordance with the invention) can be considerable. Table 1 (below) displays typical current drains in milli-amperes for such a device 10. The table has three rows, the first being the power consumed by the particular circuit when it is in sleep mode, the second being the power consumed by the particular circuit when it is fully on, and the third row displays the average power consumed by the wireless communications device 10 (FIG. 1) with the SCI set to 2, meaning that the device will monitor one out of every 32 paging channel slots. The values in the third row are calculated in the preferred embodiment of the present invention using the following formula:

$$\text{Power\_Consumed} = ((16*\text{SCI}-1)\text{Power\_Sleep} + \text{Power\_On})/(16*\text{SCI})$$

where Power_Sleep is the power consumed by the circuitry when the circuit is sleeping and Power_On is the power consumed by the circuitry when the circuit is on.

TABLE 1

| Mode | RF TX/RX | AFE | CMC | DSP | CPU | Flash Memory | SRAM | Other | Total |
| --- | --- | --- | --- | --- | --- | --- | --- | --- | --- |
| Sleep | 7.70 | 3.50 | 5.00 | 1.00 | 1.00 | 1.00 | 1.00 | 2.98 | 23.18 |
| On | 105.70 | 51.00 | 35.00 | 18.00 | 17.00 | 6.00 | 2.50 | 15.59 | 250.79 |
| Total | 10.76 | 4.98 | 5.94 | 1.53 | 1.50 | 1.16 | 1.05 | 3.37 | 30.29 |

If the wireless communications device 10 (FIG. 1) were not operating in slotted mode with SCI equal to 2, the device would be consuming 250.79 milli-amperes, instead of 30.29 milli-amperes, or 8.28 times the total current drain on the battery of the device.

While the embodiments of the present invention which have been disclosed herein are the preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the corresponding structures, materials, acts, and equivalents of any means- or step-plus-function elements in the claims below are hereby described to include any structure, material, or acts for performing the claimed functions in combination with other claimed elements as specifically claimed.

I claim:

1. A method for operating a wireless communications device in a low power mode wherein the wireless device contains circuit components and communicates in accordance with a Code Division Multiple Access (CDMA) standard, the method comprising the steps of:

controlling the operation of the circuit components to operate in either a low-power standby mode or an operating mode;

detecting a first condition wherein the first condition is a slotted mode of operation;

in response to the detection of the first condition, operating a first set of circuit components in a low-power standby mode and operating a second set of circuit components in the operating mode;

detecting a second condition wherein the second condition is a scanning mode of operation; and in response to the detection of the second condition, operating a third set of circuit components in a low-power standby mode and operating a fourth set of circuit components in the operating mode, wherein the third set of circuit components differs from the first set of circuit components.

2. The method as defined in claim 1, wherein the first set of circuit components includes at least one from the group consisting of: a pilot channel searching component, at least one data demodulating component, an automatic gain controller unit, an arithmetic unit, and a combiner unit.

3. The method as defined in claim 1, wherein the second set of circuit components includes at least one from the group consisting of: memory, a plurality of registers, and a state machine that controls the operation of the second set of circuit components.

4. The method as defined in claim 1, wherein the circuit components are portions of an integrated circuit device, wherein the portions comprise, in part hardware and in part executable code.

5. The method as defined in claim 1, wherein the third set of circuit components includes at least one from the group consisting of: at least one data demodulating component, an automatic gain controller unit, an arithmetic unit, and a combiner unit.

6. The method as defined in claim 1, wherein the fourth set of circuit components includes at least one from the group consisting of: memory, a pilot channel searching component, an arithmetic unit, a plurality of registers, and a state machine that controls the operation of the fourth set of circuit components.

7. A method for operating a wireless telecommunications device communicating in accordance with a CDMA standard after device power-up and initialization, and as the device enters a slotted mode operation, the method comprising the steps of:

(a) placing the device into a sleep mode, wherein during the sleep mode a first set of circuit components is operated in a low-power mode;

(b) waiting a predetermined period of time;

(c) waking the device from the sleep mode;

(d) performing a scan of a base station pilot channel sequences to maintain synchrony with the CDMA system time, wherein while the scan is performed a second set of circuit components is operated in a low-power mode, the second set of circuit components differing from the first set of circuit components;

(e) monitoring a paging channel slot; and (f) repeating steps (a) through (e).

8. The method as defined in claim 7, wherein the first set of circuit components include a plurality of components selected from the group consisting of: a radio-frequency transmitter/receiver, an analog front end, a CDMA modem circuit, a central processing unit, a digital signal processor, a coder/decoder, and an interface controller.

9. The method as defined in claim 8, wherein the low-power mode is further defined by operating a plurality of components within the CDMA modem circuit in a standby mode, the plurality of components within the CDMA modem circuit includes at least one from the group consisting of: a pilot channel searching component, at least one data demodulating component, an automatic gain controller unit, an arithmetic unit, and a combiner unit.

10. The method as defined in claim 7, wherein the predetermined period of time is defined so that the device wakes prior to an expected arrival of a paging channel slot, to ensure that the pilot channel scan is performed prior to the paging channel slot.

11. A method for operating a wireless telecommunications device communicating in accordance with a CDMA standard as the device enters a scanning mode whereby the device scans for alternate base stations in a different CDMA frequency mode of operation comprising the steps of:

saving the current state of the device;

placing the device into a sleep mode, wherein the sleep mode is defined by operating a first set of circuit components in a low-power mode;

performing a scanning operation, wherein during the scanning operation a second set of circuit components is operated in a low-power mode, the second set of circuit components differs from the first set of circuit components;

waking the device from the sleep mode; and restoring the saved state of the device.

12. The method as defined in claim 11, wherein the first set of circuit components include a plurality of components selected from the group consisting of: a radio-frequency transmitter/receiver, an analog front end, a CDMA modem circuit, a central processing unit, a digital signal processor, a coder/decoder, and an interface controller.

13. The method as defined in claim 12, wherein the low-power mode is further defined by operating a plurality of components within the CDMA modem circuit in a standby mode, the plurality of components within the CDMA modem circuit includes at least one from the group consisting of: at least one data demodulating component, an automatic gain controller unit, and a combiner unit.

14. A low-power wireless telecommunications device for communicating in accordance with a CDMA standard comprising:

a plurality of circuit components, including a CDMA modem circuit;

a first mechanism configured to operate the plurality of circuit components in either a first low-power sleep mode wherein the first low-power sleep mode comprises operating a first set of circuit components in slotted mode, or a second low-power sleep mode wherein the second low-power sleep mode comprises operating a second set of circuit components in a scanning mode where the second set of circuit components differs from the first set of circuit components, the first mechanism operating the plurality of circuit components in one of the low-power sleep modes when the device is not in use in a phone call;

a second mechanism operative when the device is operating in one of the low-power sleep modes, the second mechanism periodically checking whether there is a demand for the device; and a third mechanism responsive to the second mechanism for waking the device from the sleep mode.

15. The device as defined in claim 14, wherein the first sleep mode is defined by operating a set of circuit components within the CDMA modem circuit in a low-power mode, the set of circuit components including at least one from the group consisting of: a pilot channel searching component, at least one data demodulating component, an automatic gain controller unit, an arithmetic unit, and a combiner unit.

16. The device as defined in claim 14, wherein the second sleep mode is defined by operating a set of circuit components within the CDMA modem circuit in a low-power mode, the set of circuit components including at least one from the group consisting of: at least one data demodulating component, an automatic gain controller unit, and a combiner unit.

17. The device as defined in claim 14, wherein the first mechanism includes a processing component and executable program code for operating the processing component as a state machine.

18. A low-power wireless telecommunications device for communicating in accordance with a CDMA standard comprising:

a plurality of circuit components, including a CDMA modem circuit;

first means for operating the plurality of circuit components in either a first low-power sleep mode wherein the first low-power sleep mode comprises operating a first set of circuit components in slotted mode, or a second low-power sleep mode wherein the second low-power sleep mode comprises operating a second set of circuit components in scanning mode where the second set of circuit components differs from the first set of circuit components, the first means operating the plurality of circuit components in one of the low-power sleep modes when the device is not in use;

second means for periodically checking whether there is a demand for the device; and third means responsive to the second means for waking the device from the low-power sleep mode.

* * * * *